United States Patent
Slemmer et al.

(10) Patent No.: US 7,254,417 B2
(45) Date of Patent: Aug. 7, 2007

(54) CAR-SAFE MESSAGING INTERFACES FOR INTERACTIVE PAGERS AND RELATED METHODS

(75) Inventors: John Blake Slemmer, Norcross, GA (US); Ryan Lee Schaub, Snellville, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 570 days.

(21) Appl. No.: 10/767,186

(22) Filed: Jan. 29, 2004

(65) Prior Publication Data

US 2005/0170869 A1    Aug. 4, 2005

(51) Int. Cl.
*H04M 1/00* (2006.01)
(52) U.S. Cl. .............................. 455/556.1; 455/569.1; 455/563
(58) Field of Classification Search ................ 455/557, 455/569.1, 569.2, 563, 575.1, 556.1, 90.3; 345/172, 173; 250/214 P, 214 LA
See application file for complete search history.

(56) References Cited

U.S. PATENT DOCUMENTS 6,690,362 B1 *  2/2004  Motoyama et al. ......... 345/173
2003/0008680 A1 *  1/2003  Huh et al. .................. 455/557
2004/0097195 A1 *  5/2004  Selleck ...................... 455/41.3
2005/0051704 A1 *  3/2005  Kashiura et al. ........ 250/214 A

OTHER PUBLICATIONS

"ISD Announces Shipment of its 25 Millionth Chip to Panasonic for Innovative Cellular Phone Design," *Winbond News Release*, Las Vegas, NV, Jan. 5, 1996.
"ISD Expands Global Customer Base: Announces Innovative, Design Wins for its Chipcorder Voice Technology," *Winbond News Release*, San Jose, CA, Nov. 20, 1995.
Panasonic Operating Instructions Brochure.

* cited by examiner

*Primary Examiner*—Edward F. Urban
*Assistant Examiner*—Tu X. Nguyen
(74) *Attorney, Agent, or Firm*—Myers Bigel Sibley & Sajovec

(57) ABSTRACT

Messaging interfaces that may be used in conjunction with interactive pagers include a housing that contains a message processing circuit, a user interface, and a communications circuit that is used to forward the text messages between the message processing circuit and an interactive pager. The user interface may be used to forward messages between a user of the interactive pager and the message processing circuit. The user interface may be a keypad (or any other collection of user-selectable keys, buttons, menu items, etc.), a microphone, an internal speaker and/or an external speaker such as the speakers on an automobile stereo system.

31 Claims, 4 Drawing Sheets

CAR-SAFE MESSAGING INTERFACES FOR INTERACTIVE PAGERS AND RELATED METHODS

FIELD OF THE INVENTION

The present invention relates to interactive pagers and, more particularly, to messaging interfaces for interactive pagers and related methods of using such messaging interfaces.

BACKGROUND OF THE INVENTION

In recent years, a large number of handheld wireless text messaging devices, which are also known as "interactive pagers", have been brought to market. These interactive pagers may be used to transmit and/or receive text messages that are displayed to a user on a display screen. Examples of devices that include a wireless text messaging capability are paging devices that include a reply capability, wireless e-mail devices such as the Blackberry devices marketed by Research in Motion Limited, various personal data assistants such as devices that use the Palm operating system and the Windows Pocket PC operating system and cellular telephones that include text messaging capabilities.

The above-mentioned interactive pagers use one or more of a wide variety of input devices for inputting text messages into the device. For instance, with cellular telephones, the telephone keypad typically is used to "type" in a text message. Other devices such as the Blackberry devices include an integrated keyboard which may be used to type in a text message, and with other devices the text message may be typed into a computer and then downloaded to the interactive pager. Additionally, many devices such as Personal Data Assistants include on-screen keyboards, external keyboards and/or handwriting recognition capabilities that allow a user to use a stylus to handwrite the text message on a screen, touchpad or the like. Many interactive pagers include more than one of the representative input devices discussed above and/or other input devices that are known in the art Each of the above-mentioned input devices may have its own limitations. For instance, because most interactive pagers are relatively small, the keyboards and/or keypads provided on such devices typically have relatively small keys or "buttons." These buttons may be more difficult to use than, for example, the keys on a standard computer keyboard. Additionally, many input devices include only a twelve button numeric keypad which is used to input the text messages. Because a separate button is not provided for each possible alpha-numeric entry, such keypads are also typically more difficult to use than a standard computer keyboard. These small size interactive pagers may use relatively small display screens which may be difficult to read and/or may use extensive scrolling to read longer messages.

SUMMARY OF THE INVENTION

According to embodiments of the present invention, messaging interfaces are provided that may be used in conjunction with handheld wireless text messaging devices or "interactive pagers." These messaging interfaces may include a housing that contains a message processing circuit, a user interface, and a communications circuit that is used to forward the text messages between the message processing circuit and the interactive pager. In embodiments of the present invention, the user interface may be a keypad (or any other collection of user-selectable keys, buttons, menu items, etc.), a microphone, an internal speaker or an external speaker such as the speakers on an automobile stereo system. In certain embodiments of the present invention two or more different user interfaces may be provided (e.g., a keypad, a microphone and an internal speaker).

The message processing circuit may include a voice recognition circuit that is configured to convert an audio message that is received via the microphone into a text message. The message processing circuit may also include a voice synthesis circuit that is configured to convert a text message received at the interactive pager into an electronic signal that is played to the user through the speaker. The communications circuit may, for example, be implemented as a communications port that mates with a communications port on the interactive pager. The messaging interface may also include a docking cradle, and the communications circuit may be implemented as part of the docking mechanism.

The messaging interface may also include a memory storage device that may be used to store pre-defined text messages. A user may select one of these pre-defined text messages to send as a reply to a received text message via a spoken command and/or by pressing one of the keys on the keypad. The pre-defined messages may be pre-set at the time of manufacture and/or selected and input by the user. The buttons on the keypad may come in at least two different shapes. The buttons may also be backlit, and a photocell or other light sensor may be used to automatically turn the backlighting feature on and off.

Pursuant to further embodiments of the present invention, methods of responding to a text message using a messaging interface are provided. Pursuant to these methods, a text message may first be received on an interactive pager. A command may then be entered into the messaging interface that selects a pre-defined text message that is stored in memory in the messaging interface. The selected pre-defined text message may then be forwarded from the messaging interface to the interactive pager where it is transmitted as a response to the received text message.

In performing these methods, the command may, for example, be entered into the messaging interface by stating a verbal command into a microphone and/or by selecting one of the buttons provided on a keypad user interface. The methods may also include notifying the user of the interactive pager that a text message has been received. This may be accomplished, for example, by an audio alert or by illuminating an indicator light on the messaging interface.

Pursuant to still further embodiments of the present invention, methods of outputting a text message received on an interactive pager are provided. With these methods, a text message may be received on the interactive pager. The received text message may then be forwarded via a communications circuit to an external messaging interface. A voice synthesis circuit resident on the external messaging interface may then be used to convert the received text message into an electronic signal. The electronic signal may be forwarded to a speaker that then outputs the electronic signal to the user as an audio message.

As will further be appreciated by those of skill in the art, while described above primarily with reference to method and device aspects, the present invention may be embodied as methods, systems and/or computer program products. Furthermore, other systems, methods and/or computer program products according to embodiments will be or become apparent to one with skill in the art upon review of the following drawings and detailed description. It is intended that all such additional systems, methods and/or computer program products be included within this description, be within the scope of the present invention, and be protected by the accompanying claims.

DETAILED DESCRIPTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described below with reference to flowchart illustrations and/or block diagrams of methods and devices according to embodiments of the invention. It will be understood that various blocks of the flowchart illustrations and/or block diagrams, and combinations of various blocks in the flowchart illustrations and/or block diagrams, can be implemented by computer program instructions. These computer program instructions may be provided to a programmable data processing apparatus to produce a machine, such that the instructions, which execute via the programmable data processing apparatus, create means for implementing the functions/acts specified in the flowchart and/or block diagram block or blocks.

These computer program instructions may also be stored in a computer-readable memory that can direct a programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions/acts specified in the flowchart and/or block diagram block or blocks.

The present invention is also described herein with respect to various circuits. As will be appreciated by one of skill in the art, various of the circuits included in embodiments of the present invention may take the form of entirely software embodiments, entirely hardware embodiments or embodiments combining software and hardware aspects.

Figure 1:
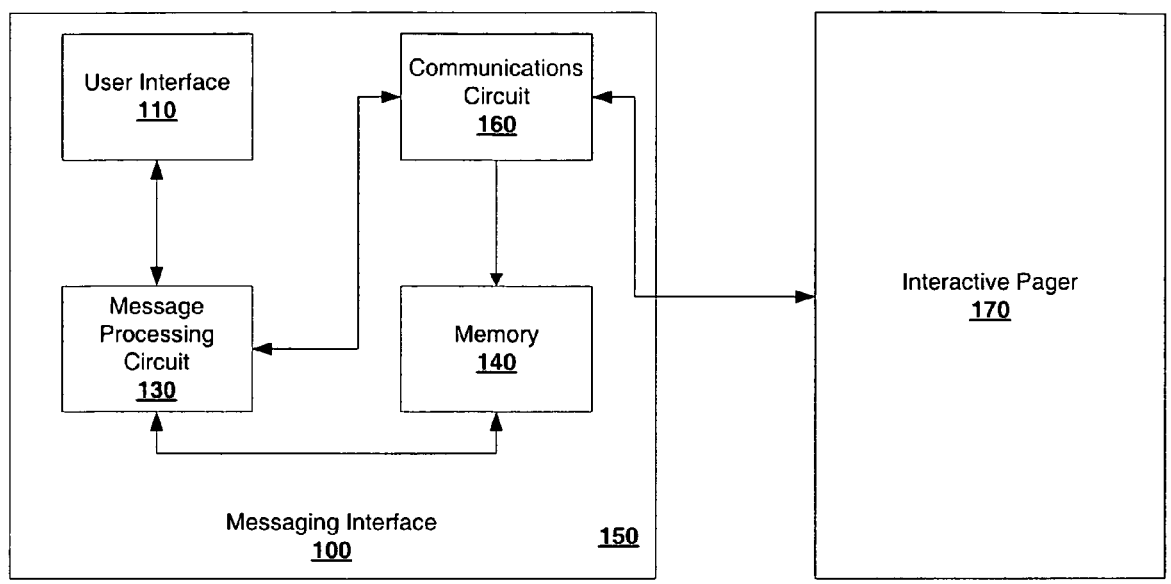
FIG. 1 is a block diagram of a messaging interface according to embodiments of the present invention.

Various embodiments of the present invention will now be described with reference to the figures. FIG. 1 is a block diagram of a messaging interface 100 for an interactive pager 170 according to embodiments of the present invention. Herein, the term "interactive pager" is used to refer to any handheld wireless communication device having a text messaging capability including, for example, pagers such as the Motorola T-900 pager that include the capability to reply to a text message with another text message, wireless e-mail devices such as the Blackberry devices marketed by Research in Motion Limited, personal data assistants such as devices that use the Palm operating system and the Windows Pocket PC operating system that include wireless e-mail capability and cellular telephones that include text messaging capabilities.

As shown in FIG. 1, the messaging interface 100 is a stand-alone device that is contained within its own housing 150 that is separate from the interactive pager 170. In embodiments of the present invention, the housing 150 may be configured so that it may be conveniently mounted to a dashboard, console or other interior surface of an automobile. The housing 150 may be made of any suitable material, including various metals, plastics, composite and other materials, and/or a combination thereof.

As shown in FIG. 1, the messaging interface 100 includes a user interface 110. The user interface 110 is typically located at least partly within the housing 150 (meaning that the user interface 110 is at least partly in the interior of the housing 150 and/or mounted on the housing 150). The user interface 110 may be used by a user of the interactive pager 170 to input a message that the interactive pager 170 will transmit as a text message to a remote device and/or to output a text message received by the interactive pager 170 to the user. As will be described in more detail below, in embodiments of the present invention the user interface 110 may comprise a keypad having a plurality of buttons, a microphone with associated circuitry and/or a speaker with associated driver circuitry.

In embodiments of the present invention, the messaging interface 100 may further include a memory storage device 140. The memory storage device 140 can include, but is not limited to, one or more of the following types of devices: cache, ROM, PROM, EPROM, EEPROM, flash memory, SRAM, and DRAM. As discussed in greater detail herein, the memory storage device 140 may be used to store a plurality of pre-defined messages that may be included with certain of the messaging interfaces 100 according to embodiments of the present invention.

As is also shown in FIG. 1, the messaging interface 100 also includes a message processing circuit 130. The message processing circuit 130 is coupled to the user interface 110, the memory storage device 140 and a communications circuit 160. The message processing circuit 130 may take a variety of forms, and may, for example, comprise logic circuits, registers, buffers and/or other electronic circuit components that are configured to implement the functionality of the message processing circuit 130 described herein. As will be described in detail below, the message processing circuit 130 may include a voice recognition circuit and/or a voice synthesis circuit. The voice recognition circuit may be implemented as any combination of hardware and/or software that takes an input voice signal received over a microphone and converts it into text. The voice synthesis circuit may be implemented as any combination of hardware and/or software that takes an input text message and outputs a signal that may be played over a speaker or other output device to provide a synthesized spoken rendition of the text message. In embodiments of the present invention, the message processing circuit 130 may be implemented in full or in part as a data processing system running one or more software applications.

Figure 2:
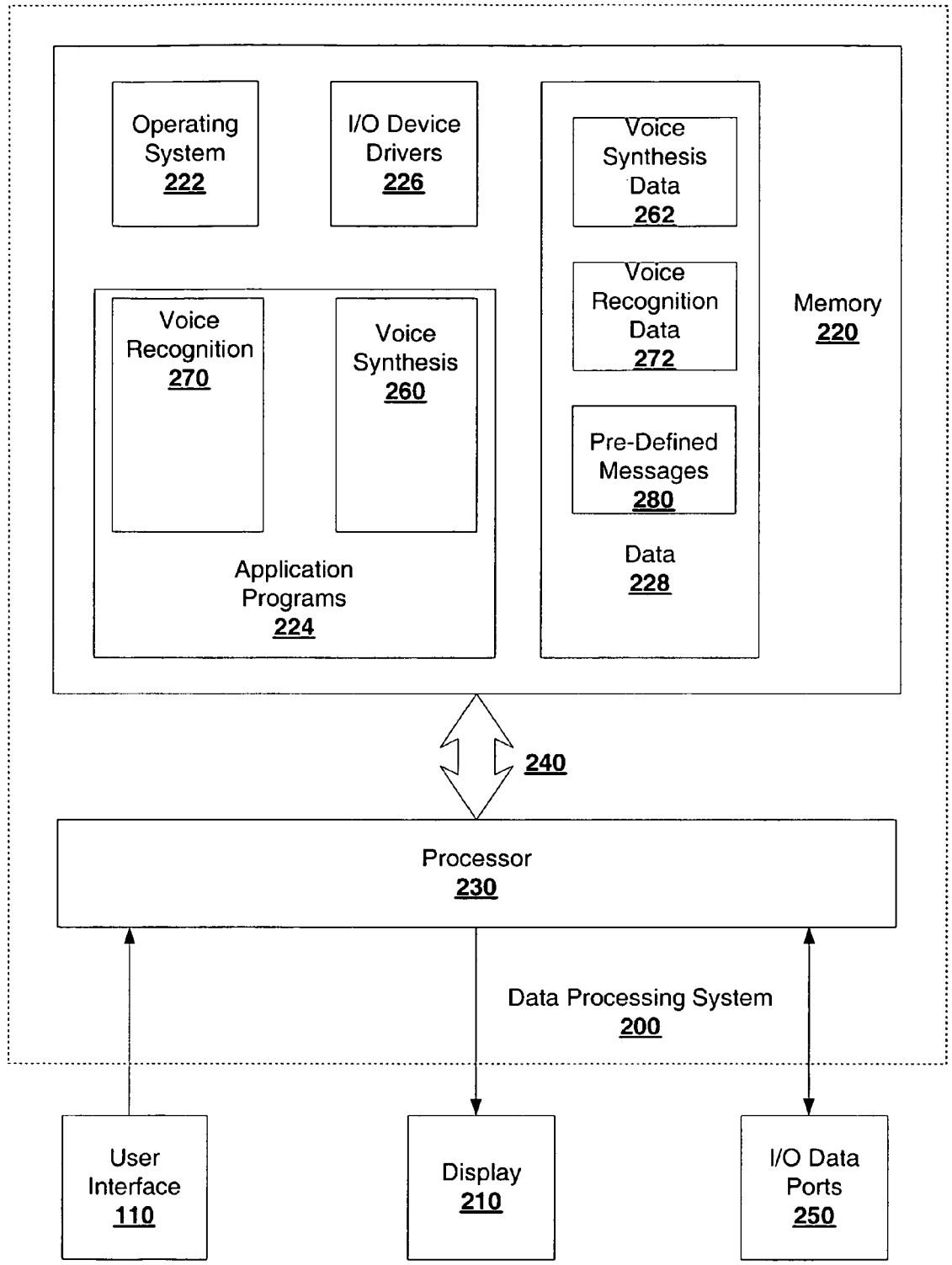
FIG. 2 is a block diagram of a data processing system suitable for use in embodiments of the present invention.

FIG. 2 is a block diagram illustrating an examplary data processing system 200 that may be used to implement the message processing circuit 130 and/or other aspects of the messaging interfaces of the present invention such as the communications circuit 160. As shown in FIG. 2, the data processing system 200 may be coupled (either directly or indirectly) to a display 210 and/or to one or more user interfaces 110 such as, for example, a keypad, microphone and/or speaker along with any associated circuitry. The data processing system 200 may also include a memory 220 that communicates with a processor 230 via an address/data bus 240. The processor 230 can be any commercially available or custom microprocessor. The data processing system 200 may also be coupled to I/O data ports 250 that also communicate with the processor 230. The I/O data ports 250 can be used to transfer information between the data processing system 200 and the interactive pager 170 and/or an external user interface such as the speakers on a car stereo system. The above identified components may be conventional components, such as those used in many conventional data processing systems, which may be configured to operate as described herein.

The memory 220 is representative of the overall hierarchy of memory devices containing the software and data used to implement the functionality of the data processing system 200. The memory storage device 140 (see FIG. 1) may function as the memory 220, or the memory 220 may be a separate device or set of devices. The memory 220 can include, but is not limited to, the following types of devices: cache, ROM, PROM, EPROM, EEPROM, flash memory, SRAM, and DRAM. As shown in FIG. 2, the memory 220 may include several categories of software and data used in the data processing system 200: an operating system 222; application programs 224; input/output (I/O) device drivers 226; and data 228. As will be appreciated by those of skill in the art, the operating system 222 may be any operating system suitable for use with a data processing system including commercially available operating systems such as the Windows Pocket PC operating system from Microsoft Corporation, Redmond, Wash. and/or a custom operating system. The I/O device drivers 226 may include software routines accessed through the operating system 222 by the application programs 224 to communicate with devices such as the I/O data port(s) 250 and certain memory 220 components. The application programs 224 are illustrative of the programs that implement the various features of the data processing system 200 and preferably include at least one application which supports operations according to embodiments of the present invention. Finally, the data 228 represents the static and dynamic data used by the application programs 224, the operating system 222, the I/O device drivers 226, and other software programs that may reside in the memory 220.

As is further seen in FIG. 2, the application programs 224 may include a voice synthesis application 260 and/or a voice recognition application 270. The voice synthesis application 260 may be any conventional software application that converts text to synthesized speech. The voice synthesis application 260 may also be implemented as a custom software application. The voice synthesis application 260 may also comprise a multi-purpose application that performs voice synthesis operations. The voice synthesis application 260 may use data 262 stored in memory 220 such as, for example, a database of words and corresponding synthesized speech.

The voice recognition application 270 may be any commercially available voice recognition software program, such as, for example, the Via Voice application by IBM Corporation. The voice recognition application 270 may also be implemented as a custom software application. The voice recognition application 270 may also comprise a multi-purpose application that performs voice recognition operations. The voice recognition application 270 may also operate in conjunction with data 272 stored in memory 220.

The data portion 228 of memory 220 may include the data sets 262, 272 discussed above that operate in conjunction with the voice synthesis application 260 and the voice recognition application 270, respectively. The data portion 228 of memory 220 may also include a data set 280 containing a plurality of pre-defined messages which will be discussed in greater detail herein.

While the voice synthesis application 260, the voice recognition application 270 and the components of the data portion 228 of memory 220 are illustrated in FIG. 2 as being part of a single data processing system 200, as will be appreciated by those of skill in the art, the illustrated functionality and data may be distributed across one or more data processing systems. For example, the functionality of the voice synthesis application 260 may be provided on a data processing system that is resident in the messaging interface 100 while the voice recognition application 270 may run on a data processing system resident on the interactive pager 170. It will also be appreciated that various applications could be incorporated into the operating system 222 or some other logical division of the data processing system 200. Thus, the present invention should not be construed as limited to the configuration of FIG. 2, but is intended to encompass any arrangement, division of functions between data processing systems and/or configuration capable of carrying out the operations described herein.

Referring again to FIG. 1, it is shown that the messaging interface 100 further includes a communications circuit 160. The communications circuit 160 may be any circuit that supports, at least in part, a wired or wireless link between the messaging interface and the interactive pager including, for example, an internal and/or external bus, one or more serial, parallel, USB and/or other connection via one or more data ports, a Bluetooth, Wi-Fi or other wireless connection, etc. At least part of the communications circuit 160 may be implemented as a software application that runs on a data processing system such as the data processing system 200 depicted in FIG. 2. The communications circuit 160 is used to forward received text messages from the interactive pager 170 to the messaging interface 100 and to forward text messages generated by the messaging interface 100 to the interactive pager 170. The communications circuit 160 may also be coupled to the memory storage device 140.

Embodiments of the present invention can provide "car-safe" messaging interfaces that may be used to review and/or respond to text messages received over an interactive pager while driving or performing other activities that require a high degree of attention. Responding to text messages using conventional interactive pagers may be very dangerous if attempted while driving. In order to read an incoming text message, a driver typically must divert his attention from the road in order to read the message on a small display device. Drafting a response to the received text message may be even more difficult, as the driver will typically need to use at least one hand to type or write in a response using, for example, a small keyboard, a stylus, or a keypad while at the same time steering the car and paying close attention to the road. In addition to driving, there are many other situations where a user may need to devote sufficient attention to a task so as to make it difficult or impossible to safely review and respond to text messages received over a conventional interactive pager.

Figure 3:
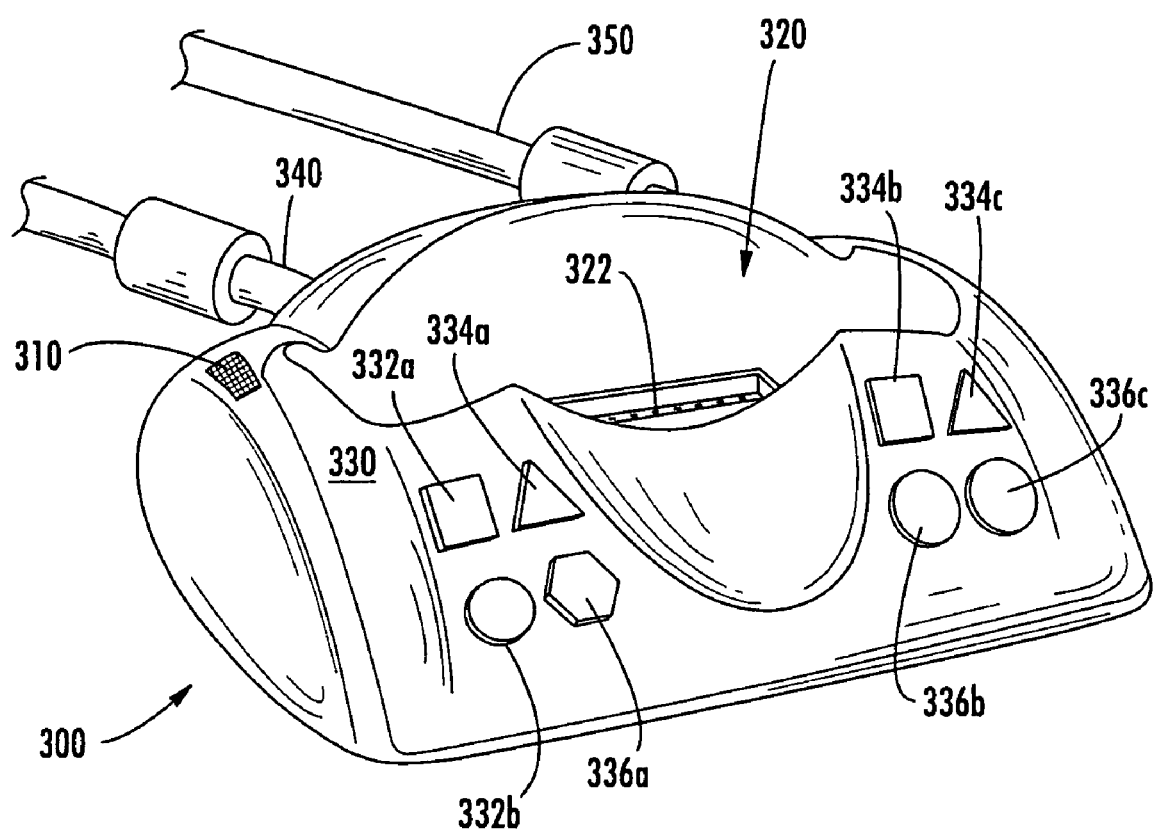
FIG. 3 is a schematic diagram of a messaging interface according to certain embodiments of the present invention.

FIG. 3 is a schematic diagram illustrating a messaging interface 300 according to embodiments of the present invention that may allow users to safely review and respond to received text messages while driving or performing other similar tasks. As shown in FIG. 3, the messaging interface 300 may include a microphone 310, a cradle 320 that includes a connection port for connecting to the interactive pager 170, and/or a keypad 330. The messaging interface may further include a first external connection 340 configured to couple to a cigarette lighter or other external power source, and a second external connection 350 that is configured to interface with an external speaker such as the speakers in a car stereo system.

As shown in FIG. 3, the keypad 330 includes a plurality of keys or "buttons" 332a, 332b, 334a, 334b, 334c, 336a, 336b, 336c. Herein the term "keypad" is used to refer to any input device that includes a plurality of options that a user may select via direct or indirect (e.g., via a pointing device) physical contact, including a conventional keyboard or keypad, custom keyboards and keypads, groupings of a plurality of buttons or other user selectable options regardless of how they are grouped, touch-screen keypads, menus, etc. In embodiments of the present invention, the buttons may be relatively large and spaced apart to facilitate allowing a user to quickly and easily identify the location of a specific button while diverting the least amount of attention from another task such as driving. As shown in FIG. 3, the buttons may have different shapes (e.g., circle, triangle, square, oval, etc.) and/or may have other identifying indicia (such as a contoured top surface or a raised letter, number or other indicia on the top surface) so as to allow a user to identify a specific button without having to look directly at the keypad 330.

In the examplary embodiment of the invention depicted in FIG. 3, the keypad 330 comprises a total of eight buttons 332a, 332b, 334a, 334b, 334c, 336a, 336b, 336c. Three of the buttons (334a, 334b, 334c) comprise factory pre-set or otherwise pre-defined responses that the user may select by pressing the appropriate button. In FIG. 3, the pre-defined responses comprise the replies "Yes", "No" and "Busy." The actual response may correspond exactly to the response labeled on the button (as will typically be the case with the "Yes" and "No" responses) or may contain a more detailed response (e.g., the "Busy" button may be programmed to send the response "I am currently driving and cannot respond to your message at this time"). A wide variety of other pre-defined responses may be included on the messaging interface 100 such as, for example, "Maybe", "I'm driving", "I don't know", "I'll get back to you shortly", "Call me on my cell phone", etc.

The keypad 330 may further include one or more user-defined response buttons 336a, 336b, 336c. The embodiment depicted in FIG. 3 includes three such user-defined response buttons 336a, 336b, 336c, labeled "Reply 1", "Reply 2" and "Reply 3" respectively. In embodiments of the present invention, a user of the messaging interface 300 may select the response message associated with each of the user-defined response buttons 336a, 336b, 336c from a wide variety of pre-defined messages. This may be done, for example, by reviewing the available responses on a display device included on the wireless pager 170 and using the wireless pager to select the desired response message that will be associated with each user-defined response button 336a, 336b, 336c. In other embodiments of the present invention, the user of the messaging interface 300 may draft their own pre-defined response messages and input them into the messaging interface 300. This may be accomplished, for example, via a software routine that prompts the user to input messages for the user-defined response buttons 336a, 336b, 336c via an input device on the interactive pager 170.

As shown in FIG. 3, the messaging interface 300 may also include one or more function buttons 332a, 332b. In the embodiment of the present invention depicted in FIG. 3, the function buttons comprise a "Send" button 332a and a "Replay" button 332b. The "Replay" button 332b is discussed below with respect to embodiments of the present invention that include a voice synthesis capability. The "Send" button 332a may be used to send a response message that was selected by pressing one of the buttons 334a, 334b, 334c, 336a, 336b, 336c or to send a response message that was input via the microphone 310 as discussed below. Inclusion of a "Send" button 332a may be advantageous to reduce or minimize the chance that a user of the messaging interface 300 unintentionally sends a response message by accidentally hitting one of the response message buttons 334a, 334b, 334c, 336a, 336b, 336c. In effect, the "Send" button 332a implements a "confirmation" function that helps avoid sending unintended/accidental response messages. In embodiments of the present invention, different mechanisms for implementing the "confirmation" function may be employed, such as having the user press a selected response message button 334a, 334b, 334c, 336a, 336b, 336c twice within a predetermined time period to send the message. It will also be appreciated that the messaging interface 300 need not include a mechanism for implementing the "confirmation" function.

A wide variety of additional function buttons may be provided on the keyboard 330. For instance, a "Delete" button could be provided for deleting messages on the interactive pager 170. In embodiments of the present invention, a "Play" button may be provided that initiates reading back a proposed response message before it was sent. A "Preview" button could be provided that read selected identifying information regarding a received message such as who sent it, the title of the message, the size/length of the message and/or the time that the message was sent.

In embodiments of the present invention, the buttons 332, 334, 336 may include backlighting to facilitate using the messaging interface 300 in low light conditions, such as when it is used while driving in a car at night. The messaging interface 300 may also optionally include a photo detector or other light detection device that is used to control when and if the backlighting is activated.

As shown in FIG. 3, the messaging interface 300 may further include a cradle 320 that may include a connection 322 (and associated drivers/circuitry) that mates with a port on an interactive pager 170 when the interactive pager 170 is placed in the cradle 320. The cradle 320 may be configured to mechanically receive and support the interactive pager 170. The connection 322 may form an electrical connection between the interactive pager 170 and the messaging interface 300. The connection 322 may comprise the communications circuit 160 depicted in the block diagram illustration of FIG. 1 of a messaging interface 100 according to embodiments of the present invention. Preferably, the cradle 320 is configured so that the display device on the interactive pager 170 is readily viewable by a user when the interactive pager 170 is docked in the cradle 320. The connection 322 may, for example, comprise a USB, serial or parallel port connection between the messaging interface 300 and the interactive pager 170. The messaging interface may be programmed so that a communication link between the messaging interface 300 and the interactive pager 170 is automatically established when the interactive pager 170 is placed in the cradle 320.

In additional embodiments of the present invention, other types of communications circuits 160 may be used to establish the communications link between the messaging interface 300 and the interactive pager 170. For example, a Bluetooth or other wireless transceiver may be used to establish a communications link between the messaging interface and the interactive pager 170. In such embodiments of the present invention, the cradle 320 may be omitted, and the user can, using certain embodiments of the messaging interfaces of the present invention, review and respond to text messages without removing their interactive pager from their briefcase or pocket.

As is also shown in FIG. 3, the messaging interface may include a microphone 310. The microphone 310 may be used to receive verbally input responses to a received text message and/or other text messages that are to be transmitted by the interactive pager 170. As discussed above with respect to the embodiments of the invention depicted in FIG. 1, the messaging interface 300 may include voice recognition circuit that converts a spoken message received at the microphone 310 into a text message that is forwarded via the communications circuit 160 to an interactive pager 170 for transmission to the device that sent the received text message. The voice recognition circuit 160 may be implemented as hardware and/or software that converts an input voice signal into text.

In embodiments of the present invention, the messaging interface 300 may be "voice activated", meaning that a user may use a spoken command (e.g., "Response Message") to notify the device that a verbal statement that follows the spoken command comprises a message that should be converted into a text message and forwarded to the interactive pager for transmission. In such embodiments, various additional commands may also be pre-defined, such as a spoken command that notifies the messaging interface 300 as to when the user has finished verbally inputting the response message. The messaging interface may also be programmed to recognize spoken commands that are associated with one or more of the buttons 332, 334, 336 on the keypad 330, eliminating the need for a user to actually press the button. In further embodiments of the present invention, the messaging interface may include a "Record" button 332 (not depicted in FIG. 3) that allows the user to delineate speech that comprises a verbal response message from other verbal statements.

The messaging interface 300 may include an internal or an external power supply. In the embodiment of FIG. 3, the messaging interface 300 includes an external power supply connection 340 that is configured to mate with an automobile cigarette lighter or other external AC or DC power source (specifically including the power supply on the interactive pager 170). In other embodiments of the invention, the messaging interface may include an internal power supply such as disposable and/or rechargeable batteries.

As discussed above with respect to the messaging interface 100 depicted in FIG. 1, in embodiments of the messaging interfaces according to the present invention a voice synthesis capability may be included. This voice synthesis capability may be implemented as hardware and/or software that converts the text included in a received text message into an audio signal. In such embodiments of the present invention, a speaker 352 (not shown in FIG. 3) may be provided as part of the messaging interface 300 to play the audio signal to the user. As shown in FIG. 3, in other embodiments of the present invention, a connection 350 to an external speaker such as the speakers provided with a car stereo system may be used to play the audio signal to the user. This connection may be made, for example, via the interface provided on the car stereo system for a cassette and/or CD player. In still further embodiments of the present invention, a wired or wireless connection to a headphone may be provided so that the synthesized voice message that corresponds to the received text message may be played over the headphone.

In embodiments of the invention that include a voice synthesis capability, the voice synthesis capability may be used to verify a response or other message that is input via the microphone 310. In particular, after the voice recognition software converts the response message into a text message, the messaging interface 300 may run the text message through the voice synthesis program before it is forwarded to the interactive pager so that the response message may be read aloud to the user before it is sent. If the user finds that the message is satisfactory, the user may then forward it to the interactive pager (e.g., by pressing the "Send" button 332) for transmission as a reply to a received text message. If the message is not deemed satisfactory, the user may delete it, for example, by pressing a "Delete" key (not shown in FIG. 3) or via a spoken command such as "Delete Message."

In embodiments of the present invention, the messaging interface may include a capability to alert a user that a text message has been received. This may be accomplished, for example, by sounding an audible alert (e.g., a distinct beep or ring or a pre-recorded or synthesized spoken message such as "you have a message, press any key to hear it") when a text message is received at the interactive pager. In embodiments of the present invention, other types of alerts may be implemented, such as an indicator light provided on the messaging interface.

The alert feature may also be coupled with the voice activation feature to facilitate hands-free reading of received text messages. For example, the messaging interface could be programmed to detect the command "Read Message" received via the microphone within a predetermined time after the messaging interface provides an alert that a text message has been received. Alternatively (or additionally), one or more buttons on the keypad (e.g., a "Play" button 332) may be programmed so that pushing the button causes the messaging interface to read a received text message aloud using the voice synthesis capability.

Pursuant to further embodiments of the present invention, the messaging interface 300 may include an internal address book and/or interface with an address book on the interactive pager 170. In these embodiments a user may input a verbal command into the messaging interface via a microphone indicating that they want to send a message. The user may then input a command identifying the name of the intended recipient. The voice recognition circuit is used to process these commands, and forwards an instruction to the interactive pager 170 commanding it to create a new text message. The messaging interface and/or the interactive pager 170 may then identify the address of the recipient of the message by reference to the address book. In this way, a user of the interactive pager 170 may, using the voice recognition circuit in the messaging interface, use verbal commands to initiate, address dictate and send a text message solely through voice commands.

It will be appreciated that the messaging interfaces of the present invention need not include all of the features included in the exemplary messaging interfaces depicted in FIGS. 1 and 3. By way of example, the messaging interface 300 of FIG. 3 might be modified to remove the microphone 310 and the speaker connection 350, as well as the voice recognition and voice synthesis software/hardware. In such an embodiment of the present invention, the keypad 330 would function as the sole user interface, and the messaging generation circuit 130 (see FIG. 1) might be implemented using logic gates, registers and/or other basic circuit elements. Similarly, in other embodiments of the present invention the keypad 330 may be omitted and the microphone 310 and an external or internal speaker comprise the user interface. It will be appreciated that a variety of different combinations are possible, and that the present invention is not limited to any particular combination.

Figure 4:
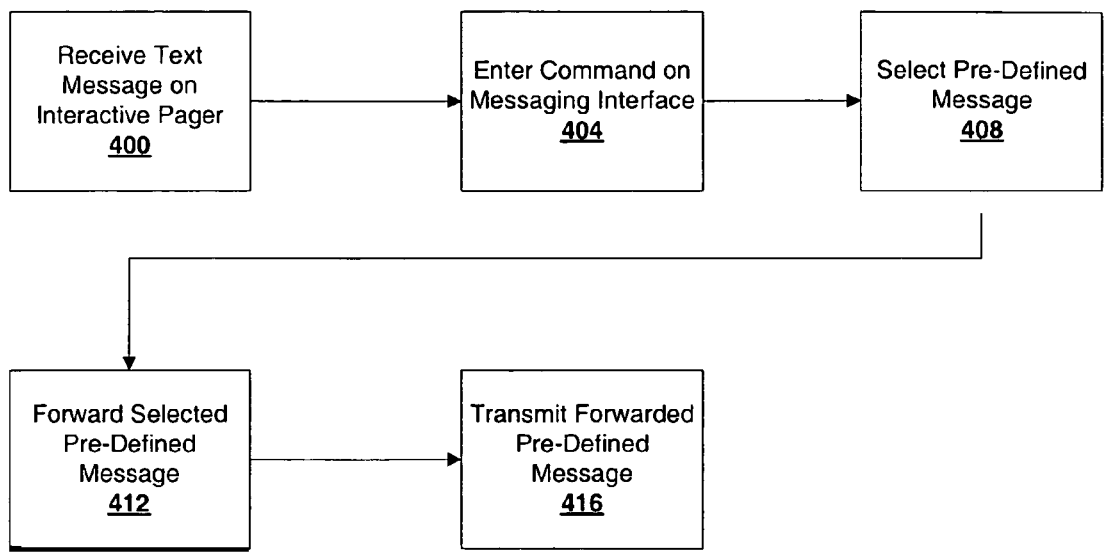
FIG. 4 is a flow chart depicting operations according to embodiments of the present invention.

Particular embodiments of the present invention will now be described with reference to FIGS. 4 and 5. FIG. 4 illustrates operations that may be performed to respond to a text message received on an interactive pager using an external messaging interface pursuant to embodiments of the present invention. As seen in FIG. 4, operations start with the receipt of a text message on the interactive pager (block 400). The text message may be received by any conventional techniques. The interactive pager and/or the messaging interface may sense that a message has been received and may optionally alert the user that an unread message is waiting by, for example, sounding an audible alert or illuminating a message waiting light. Next, a command may be entered into the external messaging interface (block 404). This may be accomplished in a variety of ways including, for example, by pressing a button on a keypad or by speaking a verbal command into a microphone on the messaging interface.

One of a plurality of pre-defined messages may then be selected that corresponds to the entered command (block 408). For example, if the user enters a command by pressing a button labeled User-Defined Reply No. 1, the messaging interface will select the pre-defined text message stored in the messaging interface that corresponds to the selected button. The messaging interface then forwards the selected pre-defined text message to the interactive pager (block 412). This may be done using a communication circuit that establishes a data transport link between the messaging interface and the interactive pager. The interactive pager may then transmit the selected pre-defined text message as a reply to the received text message (block 416).

Figure 5:
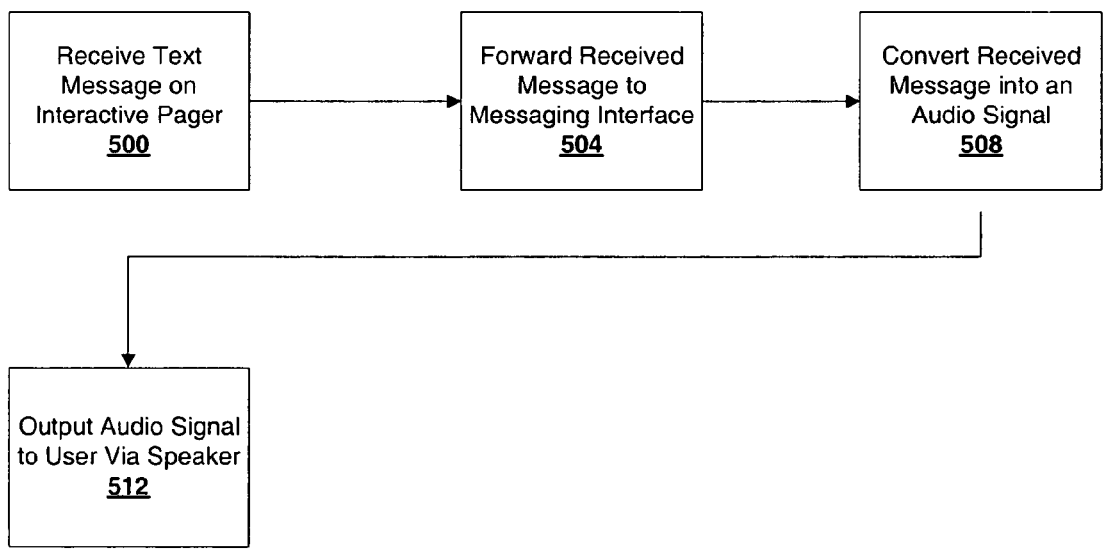
FIG. 5 is a flow chart depicting operations according to further embodiments of the present invention.

FIG. 5 illustrates operations that may be performed to output a text message that is received on an interactive pager to a user of the pager via an external messaging interface. As seen in FIG. 5, operations start with the receipt of a text message on the interactive pager (block 500). The interactive pager then forwards the received text message to the messaging interface (block 504). This may be done using a communication circuit that establishes a data transport link between the messaging interface and the interactive pager. Next, the received message is converted into an audio signal (block 508). This may be accomplished, for example, using a voice synthesis circuit (and/or application) that converts the text message into an electronic signal. The electronic signal may then be output to the user via a speaker (block 512).

In the drawings and specification, there have been disclosed exemplary embodiments of the invention. Although specific terms are employed, they are used in a generic and descriptive sense only and not for purposes of limitation, the scope of the invention being defined by the following claims.

The invention claimed is:

1. A messaging interface for an interactive pager, comprising:
   a housing;
   a message processing circuit located within the housing;
   a user interface that comprises a microphone located at least partly within the housing, the user interface configured to convey an audio message received via the microphone between a user of the interactive pager and the message processing circuit, wherein the message processing circuit includes a voice recognition circuit that is configured to convert the audio message into a text message;
   a communications circuit that is coupled to the message processing circuit and that is configured to convey the text message from the message processing circuit to the interactive pager; and
   a voice synthesis circuit located within the housing that is configured to convert the text message into an audio signal and to play the audio signal to the user before the text message is forwarded to the interactive pager so that the user can confirm that the audio message was properly converted into the text message.

2. The messaging interface of claim 1, further comprising a power supply located within the housing.

3. A messaging interface for an interactive pager, comprising:
   a housing;
   a message processing circuit located within the housing;
   a user interface located at least partly within the housing that is configured to convey a message that is associated with a text message between the interactive pager and the message processing circuit;
   a communications circuit that is coupled to the message processing circuit and that is configured to convey the text message between the message processing circuit and the interactive pager; and
   wherein the user interface comprises a microphone, the message comprises an audio message received via the microphone, and the message processing circuit includes a voice recognition circuit;
   wherein the text message comprises a text message that is conveyed from the message processing circuit to the interactive pager for transmission by the interactive pager
   wherein the messaging interface further comprises a memory storage device located within the housing that stores a plurality of pre-defined text messages, and
   wherein the audio message comprises a command that selects one of the plurality of pre-defined text messages as the text message that is conveyed from the message processing circuit to the interactive pager for transmission by the interactive pager;
   wherein the user interface further comprises a speaker and an associated driving circuit and the message processing circuit further comprises a voice synthesis circuit;
   wherein the voice synthesis circuit is configured to play through the speaker a second text message that is associated with a second message input via the microphone before the second text message is forwarded to the interactive pager to facilitate confirming that the second text message accurately reproduces the contents of the second message.

4. The messaging interface of claim 3, wherein the user interface further comprises a keypad and wherein at least some of the keys on the keypad may be used to select respective ones of the plurality of pre-defined text messages.

5. The messaging interface of claim 3, wherein the speaker is part of an automobile stereo system.

6. The messaging interface of claim 3, further comprising a docking cradle, and wherein the communications circuit comprises a communications port.

7. The messaging interface of claim 3, wherein the messaging interface is powered via an external power supply.

8. The messaging interface of claim 3, wherein at least some of the plurality of pre-defined text messages comprise pre-defined messages that are specified by the user of the interactive pager.

9. The messaging interface of claim 3, wherein at least some of the plurality of pre-defined text messages comprise factory pre-set pre-defined messages.

10. The messaging interface of claim 3, wherein the housing includes a docking cradle that is configured to mate with the interactive pager.

11. A messaging interface for an interactive pager, comprising:
    a housing;
    a microphone located within the housing;
    a voice recognition circuit located within the housing that is configured to convert an audio signal received by the microphone into a text message; and
    a communications circuit in the housing that is configured to forward the text message from the voice recognition circuit to the interactive pager;
    a memory storage device located within the housing that stores a plurality of pre-defined text messages, wherein at least some of the plurality of pre-defined messages are forwarded to the interactive pager in response to a voice command; and
    a voice synthesis circuit;
    a speaker coupled to the voice synthesis circuit;
    wherein the voice synthesis circuit is configured to play through the speaker a second text message that is associated with a second message input via the microphone before the second text message is forwarded to the interactive pager to facilitate confirming that the second text message accurately reproduces the contents of the second message.

12. The messaging interface of claim 11, wherein the text message is formatted so as to be suitable for transmission by the interactive pager, and wherein the messaging interface further comprises a keypad having a plurality of keys that are associated with at least some of the plurality of pre-defined text messages.

13. The messaging interface of claim 12, further comprising a speaker and a voice synthesis circuit that is configured to convert a second text message received by the interactive pager into an electronic signal that is played through the speaker.

14. The messaging interface of claim 12, wherein the housing includes a docking cradle that is configured to mate with the interactive pager, and wherein the communications circuit comprises a communications port.

15. The messaging interface of claim 12, further comprising a connection that draws power from a DC power source in an automobile.

16. A messaging interface for an interactive pager, comprising:
    a housing;
    a microphone located within the housing;
    a memory storage device within the housing, the memory storage device containing a plurality of pre-defined text messages;
    a plurality of user selectable indicia provided on the housing, a respective one of which is associated with a respective one of the plurality of pre-defined text messages; and
    a communications circuit configured to forward one of the plurality of pre-defined text messages from the messaging interface to the interactive pager for transmission by the interactive pager in response to the selection of one of the plurality of user selectable indicia;
    a voice synthesis circuit;
    a speaker coupled to the voice synthesis circuit;
    wherein at least some of the plurality of pre-defined text messages comprise pre-defined messages that are specified by the user of the interactive pager;
    wherein the voice synthesis circuit is configured to play through the speaker a text message that is associated with a message input via the microphone before the text message that is associated with a message is forwarded to the interactive pager to facilitate confirming that the text message accurately reproduces the contents of the message input via the microphone.

17. The messaging interface of claim 16, wherein the plurality of user selectable indicia comprise a plurality of buttons.

18. The messaging interface of claim 17, wherein at least some of the plurality of buttons are shaped differently than other of the plurality of buttons.

19. The messaging interface of claim 17, wherein the top surface of at least some of the plurality of buttons are configured differently than the top surface of other of the plurality of buttons.

20. The messaging interface of claim 17, further comprising a backlight that illuminates one or more of the plurality of buttons.

21. The messaging interface of claim 20, wherein the messaging interface further comprises a photo detector, and wherein the backlight is responsive to a signal from the photo detector.

22. The messaging interface of claim 16, wherein one of the plurality of user selectable indicia activates a SEND command.

23. The messaging interface of claim 16, wherein repeatedly selecting one of the plurality of user selectable indicia within a predetermined time period activates a SEND command.

24. The messaging interface of claim 16, further comprising a voice recognition circuit that is configured to convert an audio signal input via the microphone into a second text message, and wherein the communications circuit is further configured to forward the second text message provided by the voice recognition circuit to the interactive pager.

25. The messaging interface of claim 24, wherein the second text message provided by the voice recognition circuit may comprise one of the plurality of pre-defined text messages.

26. The messaging interface of claim 17, wherein the speaker and the voice synthesis circuit are configured to convert a second text message received by the interactive pager into an electronic signal that is played through the speaker.

27. The messaging interface of claim 26, wherein at least one of the plurality of buttons may he used to cause the voice synthesis circuit to output through the speaker a synthesized voice signal that reads identifying information associated with a received text message.

28. The messaging interface of claim 16, wherein the housing includes a docking cradle that is configured to mate with the interactive pager, and wherein the communications circuit comprises a communications port.

29. A messaging interface for an interactive pager, comprising:
- a housing;
- a voice synthesis circuit located within the housing that is configured to convert a text message into an audio signal;
- a speaker responsive to the voice synthesis circuit;
- a communications circuit, located at least partly within the housing, that is coupled to the voice synthesis circuit and that is configured to forward the text message from the interactive pager to the voice synthesis circuit; and
- a microphone and a voice recognition circuit that is configured to convert an audio signal input via the microphone into a second text message,
- wherein the communications circuit is further configured to forward the second text message provided by the voice recognition circuit to the interactive pager,
- wherein the messaging interface further includes a memory storage device located within the housing that stores a plurality of pre-defined text messages, and wherein the voice recognition circuit is configured to forward one of the plurality of pre-defined messages to the interactive pager in response to the audio signal input via the microphone;
- wherein the voice synthesis circuit is configured to play back a message input via the microphone before the message input via the microphone is forwarded as a text message to the interactive pager to facilitate confirming that the text message accurately reproduces the contents of the message input via the microphone.

30. The messaging interface of claim 29, wherein the speaker is part of an automobile stereo system.

31. The messaging interface of claim 29, wherein the messaging interface further includes a keypad having a plurality of keys and a memory storage device located within the housing that stores a plurality of pre-defined text messages, and wherein at least some of the plurality of keys may be used to select respective of the plurality of pre-defined text messages.

* * * * *

UNITED STATES PATENT AND TRADEMARK OFFICE
CERTIFICATE OF CORRECTION

PATENT NO.       : 7,254,417 B2
APPLICATION NO.  : 10/767186
DATED            : August 7, 2007
INVENTOR(S)      : Slemmer et al.

It is certified that error appears in the above-identified patent and that said Letters Patent is hereby corrected as shown below:

Column 12, Claim 3, Line 52: Please correct line to read --pager,--

Column 15, Claim 27, Line 5: Please correct "may he used"
                             To read --may be used--

Signed and Sealed this

Sixth Day of November, 2007

JON W. DUDAS
*Director of the United States Patent and Trademark Office*